United States Patent [19]

Tomioka et al.

[11] 3,912,563

[45] Oct. 14, 1975

[54] METHOD OF MAKING SEMICONDUCTOR PIEZORESISTIVE STRAIN TRANSDUCER

[75] Inventors: Tatsuyuki Tomioka; Noboru Yukami, both of Hirakata, Japan

[73] Assignee: Matsushita Electric Industrial Co., Ltd., Kadoma, Japan

[22] Filed: June 5, 1974

[21] Appl. No.: 476,620

[30] Foreign Application Priority Data

| | | |
|---|---|---|
| June 11, 1973 | Japan | 48-66668 |
| June 11, 1973 | Japan | 48-69689 |
| Aug. 29, 1973 | Japan | 48-97480 |
| Oct. 15, 1973 | Japan | 48-116061 |

[52] U.S. Cl. .......... 156/13; 29/580; 156/17; 156/345

[51] Int. Cl.$^2$ .......... H01L 7/50

[58] Field of Search .......... 156/3, 11, 13, 17, 345; 357/55, 68; 29/25.35, 580, 583; 204/129.1, 129.2; 96/36, 38.2

[56] References Cited

UNITED STATES PATENTS

| | | | |
|---|---|---|---|
| 2,944,321 | 7/1960 | Westberg | 156/17 X |
| 3,117,899 | 1/1964 | McLouski | 156/17 |
| 3,162,589 | 12/1964 | Pensak | 204/129.2 X |
| 3,192,141 | 6/1965 | Fry et al. | 204/129.2 |
| 3,383,254 | 5/1968 | Kocsuta | 156/5 |
| 3,757,414 | 9/1973 | Keller | 29/580 |
| 3,819,431 | 6/1974 | Kurtz et al. | 156/17 X |
| 3,853,650 | 12/1974 | Hartlaub | 156/13 |
| 3,860,465 | 1/1975 | Matzner et al. | 156/8 |

*Primary Examiner*—William A. Powell
*Attorney, Agent, or Firm*—Wenderoth, Lind & Ponack

[57] ABSTRACT

A method of making a strain transducer having a reduced neck with an hour-glass configuration interconnecting two pads, which comprises first selectively etching a silicon plate by using gold films and photoresist films, then measuring the resistance between the common electrodes, and subsequently stopping the etching when the resistance is high enough to indicate the desired size of the etched portion of the silicon.

4 Claims, 16 Drawing Figures

METHOD OF MAKING SEMICONDUCTOR PIEZORESISTIVE STRAIN TRANSDUCER

BACKGROUND OF THE INVENTION

1. Field of the Invention

This invention relates to a method of making a semiconductor piezoresistive strain transducer element, and more particularly pertains to an easy method for making such strain transducers for phonograph cartridges, microphones, etc., by an etching process for achieving a high yield.

2. Description of the Prior Art

Various types of semiconductor piezoresistance strain transducers utilizing the piezoresistance effect of semiconductors are being utilized for the measurement of acceleration, velocity, displacement, pressure, etc. Strain transducers having a reduced neck with an hourglass configuration interconnecting two pads (hereinafter merely referred to as strain transducers), having high sensitivity, excellent heat radiation characteristics, and which are, small in size and light in weight, etc., have been finding applications in phonograph cartridges, microphones, etc.

Because the cross-sectional areas of these strain transducers are usually very small, on the order of 30$\mu$m × 40$\mu$m, however, they have heretofore been manufactured by methods which produce low yields. The reduced neck can be formed by chemical etching, and whether or not the desired neck dimensions have been obtained by ending the chemical etching after a certain number of minutes has elapsed has hitherto been determined solely by relying on the experience and intuition of skilled workers. Consequently, the range of cross-sectional areas of the reduced neck between the pads has been quite large.

The aforementioned chemical etching has usually been a selective etching conducted by using laminated gold films and photoresist films. In this method, however, because of the inadequate adhesion between the semiconductor and the gold film, the gold film is sometimes stripped off the semiconductor before the etching is completed, thereby giving rise to improper chemical etchings.

Furthermore, etching machines for carrying out the aforementioned chemical etching and having a high performance rate have hitherto been not available, resulting in large discrepencies in the cross-sectional areas of the strain transducers formed between the pads from the initial wafer.

SUMMARY OF THE INVENTION

Objects of the Invention

The aforementioned difficulties have been completely solved by the method of this invention.

The first object of this invention is to provide a manufacturing method which permits accurate judgments to be made, by monitoring the resistance of the reduced neck, in determining the time for ending the etching of the chemical etching process for forming a reduced neck with the desired cross-sectional area, thereby making the range of dimensions of the necks among the produced transducers small.

The second object is to improve the adhesion between the gold film and the semiconductor, thereby making the chemical etching process fail safe.

The third object of this invention is to provide a manufacturing method which enables the chemical etching to be carried out with only negligible differences of the sectional areas of the necks of the strain transducers formed between the wafers.

BRIEF DESCRIPTION OF THE DRAWINGS

Other objects and advantageous features of the present invention will become apparent from the following explanations taken in connection with some embodiments thereof, by referring to the accompanying drawings, in which.

DESCRIPTION OF THE PREFERRED EMBODIMENT

Figure 1:
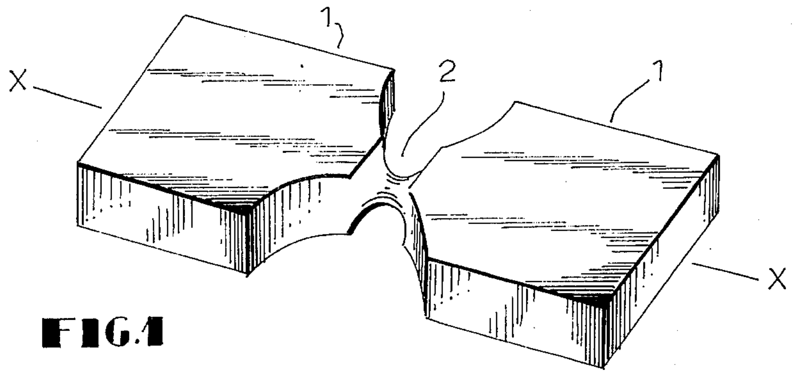
FIG. 1 is a perspective view of a strain transducer having a reduced neck with an hour-glass configuration interconnecting two pads.

FIG. 1 shows a hitherto known strain transducer of the type to which this invention relates. Pads 1 on both ends are linked by a reduced neck 2 at the center. The cross-sectional area of the reduced neck 2 is smallest at the center, growing larger in the direction toward the pads. While the resistance between the two pads is determined by the cross-sectional area and the length of the reduced neck and the specific resistance of the material, the differences in the resistances among various necks mainly results from differences in the cross-sectional area. As the two pads 1 are spaced from each other along line X—X, a strain develops in the reduced neck 2; the resistance thus changes due to the piezoresistance effect; and from this, the distance between the pads can be determined.

The present invention relates to a method of manufacturing a strain transducer having a reduced neck with an hour-glass configuration interconnecting the two pads as shown in FIG. 1. The material of the strain transducer of this invention can be any semiconductor having a piezoresistance effect, including, Si, Ge, PbTe, InSb, etc. In the following specification, the material Si is used as an example, but any of the other semiconductor materials can be used.

Figure 2:
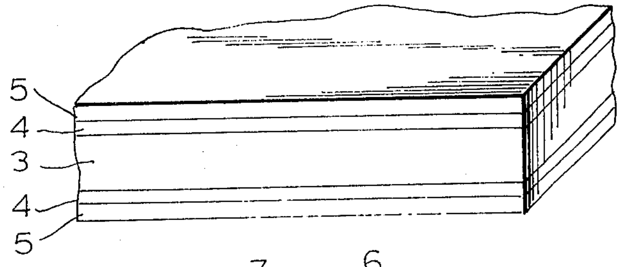
FIG. 2 is a partial perspective view of a wafer with photoresist films formed over gold films on both surfaces thereof.

Referring to FIG. 2, a silicon wafer 3 has gold films 4 formed on both surfaces, and on both of these films photoresist films 5 are coated. Examples of the thicknesses of the silicon wafer, the gold films and the photoresist films are respectively about 200$\mu$m, 0.5$\mu$m and 3$\mu$m. The gold films 4 can be formed by vacuum deposition, sputtering, ion plating, electroplating, etc. For the photoresist films 5, among other photoresist films of various kinds, KMER (Kodak Metal Etch Resist) which has excellent adherence, etching resistance, resistance to moisture, etc., is appropriate.

Figure 3:
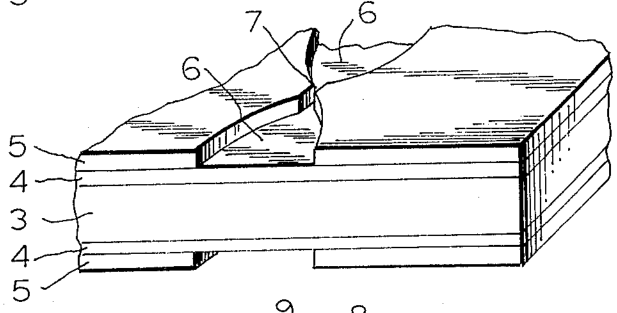
FIG. 3 is a partial perspective view of the wafer of FIG. 2 with the photoresist films engraved by a photolithographic method.
Figure 4:
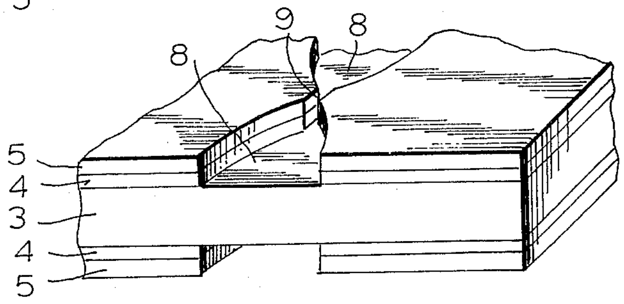
FIG. 4 is a partial perspective view of the wafer of FIG. 3 with portions of the gold films dissolved by aqua regia.

The wafer of FIG. 2 is first photolithographically etched to remove the photoresist layers 5 at the portions 6 and 7 where the material of the silicon layer 3 is to be etched away to leave neck 2, as shown in FIG. 3. The wafer of FIG. 3 is next immersed in aqua regia to remove the portions 8 and 9 of the gold films 4, to leave the silicon 8 exposed thereat, as shown in FIG. 4. The part 9 of silicon at the center (in the thickness direction) of the wafer is to be formed into the reduced neck.

Figure 5:
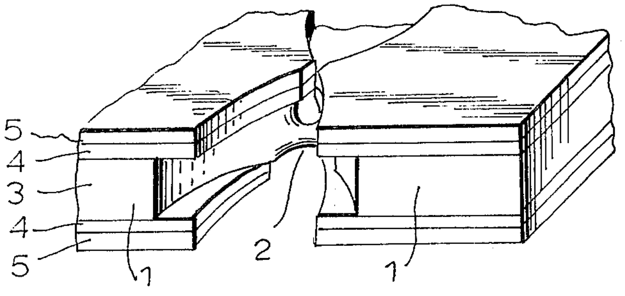
FIG. 5 is a partial perspective view of the wafer of FIG. 4 in which the reduced neck has been formed by chemical etching.

Then, the silicon wafer is immersed in the etchant in the etching machine, while holding it by a holding means. The photoresist film and gold film will not be dissolved, but the exposed silicon dissolves. Fresh etchant is not supplied enough to exposed silicon portion 9 because of its narrow width, so that progress of etching at portion 9 is slow in comparison with wider exposed silicon portion. Then, as shown in FIG. 5, the part at 9 is etched vertically and laterally into the reduced neck, and both ends thereof, which are left unetched, form the pads 1, retaining the former thickness of the silicon wafer. One example of an etchant is $HNO_3$(60% assay) : HF(46% assay) : $CH_3COOH$(99% assay) in a volume ratio of 3 : 1 : 1. The etchant is used at a liquid temperature of 30°C for an etching time of about 4 minutes.

Figure 6:
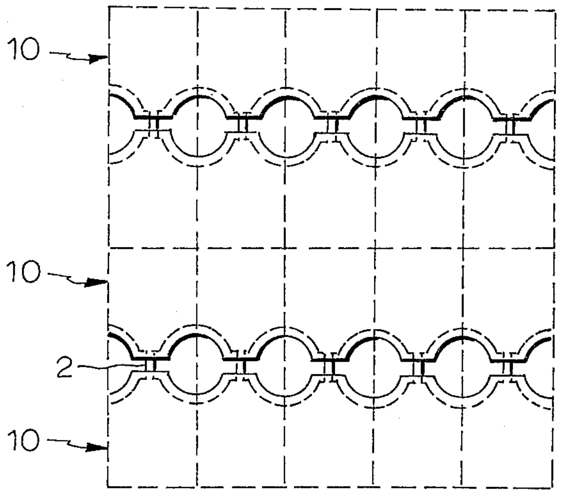
FIG. 6 is a partial plane view of the inside of the wafer, showing a large number of reduced necks linking the common pads.

While FIGS. 2–5 show portions of a plate and the steps for forming a strain transducer in the silicon wafer, a plurality of strain transducers can be formed from one wafer by placing them in a pattern as shown in FIG. 6. Each region enclosed by the lateral and longitudinal dotted lines designates a strain transducer. In the case of diode transistors, scribe lines can be provided on these dotted lines, so that the silicon will be grooved along these dotted lines. However, in the process of this invention, the scribe lines are drawn on only one side surface of the wafer. In FIG. 6, after the etching of the photoresist layers and the gold layers, the pads are covered with the photoresist films, but the reduced necks 2 are exposed. As seen in FIG. 6, on each side of these necks, the pads adjacent to each other are linked, thereby forming an aggregate of pads. The gold film is held in contact therewith, and on this gold film is the photoresist film. Accordingly, between two neighboring portions of the gold film on each surface are numerous reduced necks which can be electrically connected in parallel through the gold films.

Figure 7:
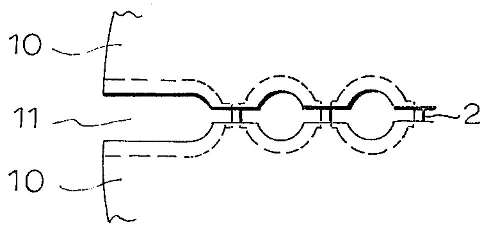
FIG. 7 is a partial plane view of the perimeter of the wafer.

The pattern at the peripheral part of the wafer does not have the pattern required for forming the reduced neck as shown in FIG. 7, so that the reduced neck which would otherwise be located at the position 11 is not formed.

Figure 8:
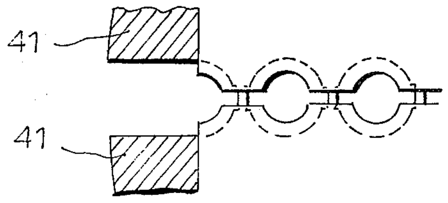
FIG. 8 is a view similar to FIG. 7 showing the photoresist film stripped from a part around the perimeter of the wafer, the common electrodes of the gold film being exposed, thereby permitting the measurement of the parallel resistance of a plurality of necks.

The edge portion of the photoresist film 5 is stripped by immersing the peripheral part of the wafer in hot concentrated $H_2SO_4$ so that the edge part 41 of the gold film is exposed, as shown in FIG. 8. The parallel resistance R of all the necks in one row of necks on the wafer can be measured by touching the tips of wafer probes on the two portions of the gold film which has been exposed on either side of the row. This step is called a resistance monitoring step. If the total number of strain transducers in the row and extending between the two portions of the gold film is assumed to be N, and each resistance to be Ri($i = 1 \sim N$), then, $$1/R = \sum_{i=1}^{N} (1/Ri).$$

For small dispersion of values of Ri, R × N (called the monitored resistance) may approximate the average value of Ri. If the target resistance in the manufacture of strain transducers is denoted by Ro, $R \approx Ro/N$ signifies that the target has been substantially attained, and accordingly, the etching step can be ended at that time. If $R < Ro/N$, this indicates that the average cross-sectional area of the reduced necks is larger than that of the target value. Then the wafer should again be etched. But due to the short etching time normally required from the second etching on, the portions of the gold film 41 are not stripped off the silicon. Accordingly, they may be repeatedly used as the electrodes. However, if the portions of the gold film are stripped, the photoresist films are further stripped by the use of hot concentrated $H_2SO_4$, to expose new portions of the gold film, and then, the resistance R' between these gold film portions is measured. By repeating the steps of the etching and measurement of resistance, $R' \approx Ro/N$ is achieved. Normally, a few repetitions of these steps will bring R' to within 5% of Ro/N. Generally, as the etchant used in the reetching step, one that gives a low etch rate is desirable, and by the use of such an etchant, it is possible to reduce R' to within 2% of Ro/N. However, even if R' deviates from Ro/N by only ±2%, after dicing the wafer, when the resistances of all the strain transducers are measured and averaged, the value obtained normally falls outside of the target value by more than 2%. This is because R' is obtained from the parallel resistances of only one row of transducers among all the rows on the wafer. Accordingly, it is evident that the accuracy may be improved by measuring the parallel resistance of a larger number of rows of strain transducers, and by using their average value.

Figure 9:
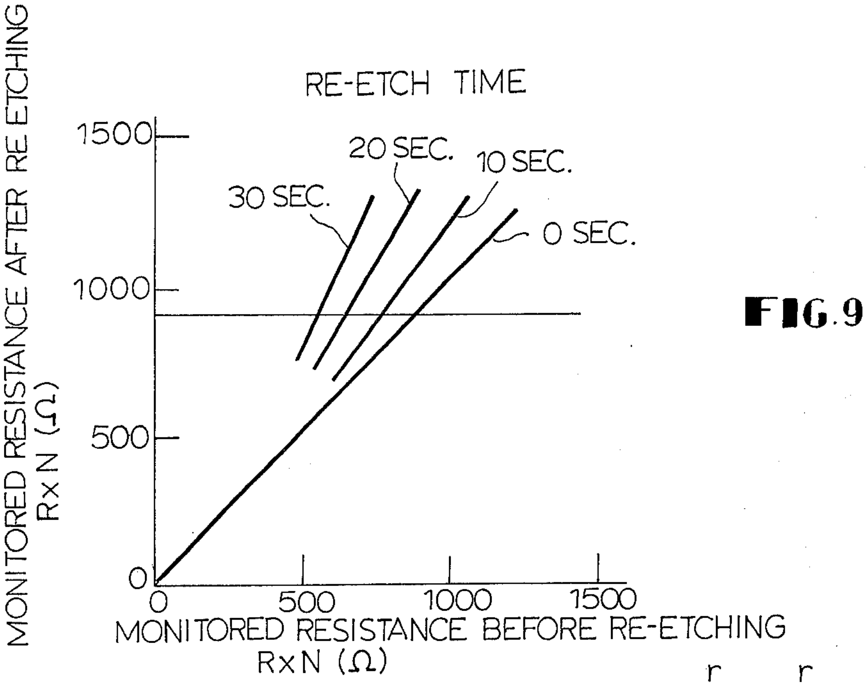
FIG. 9 is a graph showing the resistance before and after the reetching, with the reetching time as a parameter.

A graph such as shown in FIG. 9 which is prepared by measuring the monitored resistances before and after the reetching is useful in making the resistance monitoring step efficient. For example, if the target resistance Ro is 900Ω, it may be predicted from FIG. 9 that when the monitored resistance before the reetching is $R \times N = 780\Omega$, the monitored resistance of $R' \times N = 900\Omega$ can be achieved by carrying out the reetching for 10 seconds.

Figure 10:
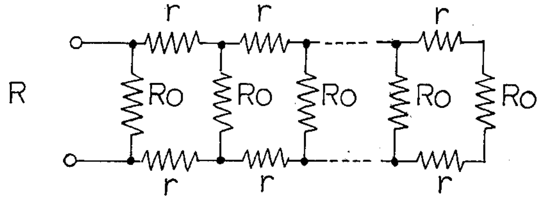
FIG. 10 is a circuit diagram showing the resistance Ro of the reduced necks linked by the resistance r of the gold film.
Figure 11:
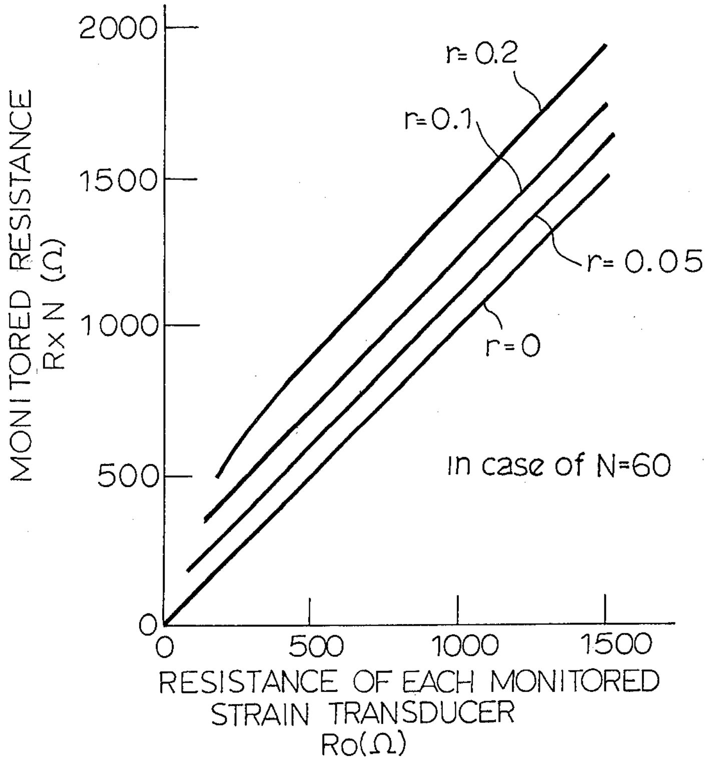
FIG. 11 is a graph showing the effect of the resistance r of the gold film on the monitored resistance.

In connection with the accuracy of the monitored resistance as measured in the resistance monitoring step, it should be noted that the monitored resistance is dependent on the thickness of the gold film. The total parallel resistance R and the resistance Ro of each strain transducer to be monitored is affected by the resistances $r$ of the portions of the gold film through which they are connected, as shown in FIG. 10. If $r = O$, then $R \times N = Ro$, where the number of monitored strain transducers is $N$. The monitored resistance will then agree with Ro, indicating that there is no problem of accuracy. However, $r$ in practice does have a finite value. Although r is made up of the resistance of the silicon wafer and the gold film, it is mainly the resistance of the gold film, because the silicon wafer commonly used has a specific resistance of only about 1Ωcm. Once the shape of the pad is set, the value of r is determined almost completely by the thickness of the gold film. The relationship between Ro and $R \times N$, with $r$ as the parameter, when $N = 60$, is shown in FIG. 11. For example, when Ro = 1,000Ω, $N = 60$ and $r = 0.05\Omega$, FIG. 11 shows the monitored resistance R × N = 1,115Ω, which is larger by more than 10% than Ro, which is too large for an adequate measurement. If this error is desired to be held within 3%, a value of $r < 0.013\Omega$ is necessary. The value $r$ is determined by the relationship $$r = p \frac{l}{tw},$$

which shows that for $r < 0.013\Omega$, the thickness $t$ of the gold film should be >0,5μm, when the specific resistance of the gold film $p = 2 \times 10^{-6}\Omega$cm and the ratio of length and width of the pad $l/w = 3$.

While in the manufacturing method described above, the photolithographic step for forming the pattern in the photoresist layer is used only once, a manufacturing method in which the photolithographic step is used twice is also feasible. In the first photolithographic step, only the part of the photoresist at the portion 8, as shown in FIG. 4, is removed, leaving the part of the photoresist at the portion 9 unaffected, i.e., the part where the reduced neck is to be formed, and accordingly, at this position, the gold film is left undissolved. When a wafer which has been thus treated is immersed in the etchant, only the exposed part of silicon is dissolved, without forming the reduced cross-section neck. In the second photolithographic step, the photoresist at the portion 9 of FIG. 4 is removed, and the gold at this portion is dissolved. Then, when wafer is further etched, the reduced neck is formed. Generally speaking, the distribution of the values of the crosssectional areas of the reduced necks is smaller when two photolithographic steps are used than when only one step is used.

The effects of the gold film used in the manufacturing method described above and improved gold films will now be described. The gold film has the effect of increasing the etch rate. If only the photoresist film is used as a protective film in carrying out the preferential etching of a silicon wafer 200μm thick to etch completely through the wafer as shown in FIG. 5, a very thick photoresist film is required, resulting in a low pattern accuracy. When the gold film is provided between silicon and the photoresist film, the etch rate is increased if the same etchant composition is used, so that the etching is completed in a shorter period of time than when no gold film is used. Accordingly, because a thinner photoresist film which resists the etchant well can be used, a high pattern accuracy is achieved.

The reason why the gold film increases the etching rate is not entirely certain. The probable mechanisms involved in silicon etching which have hitherto been offered include electrolytic attack and local chemical attack.

The electrolytic attack can be analyzed as follows:

$4e^- + Si + 6F^- \rightarrow SiF_6^{--}$ $4e^- + 8H^+ + 4NO_3^- \rightarrow 4NO_2 + 4H_2O$ The local chemical attack can be analyzed as follows:

$Si + 4HNO_3 \rightarrow SiO_2 + 4NO_2 + 2H_2O$ $SiO_2 + 6HF \rightarrow H_2SiF_6 + 2H_2O$ The present inventors believe that the gold film has the effect of accelerating the electrolytic attack.

Generally, the lower the hydrogen overvoltage of the electrode material which is immersed in an electrolyte, the easier is the generation of hydrogen gas. Thus, the reaction of $2H^+ + 2e^- \rightarrow H_2$ is facilitated. The gold, having a low hydrogen overvoltage, exhibits this property more prominently. Since the electrons used in this reaction are taken from the silicon, the electrolytic attack is accelerated, and as a consequence, the rate of etching of the silicon in the region adjacent to the gold is increased.

Although, as above described, by utilizing the gold film, not only is a high pattern accuracy achieved, but also the etching may be completed in a short period of time, nevertheless the stripping of gold from the silicon sometimes occurs during the etching, because of the weak adhesion between the gold film and the silicon. Because the force keeping the gold adhering to the silicon is the van der Waals force, the adhesion is presumed to be weak. The fact that a greatly increased adhesion can be obtained by an ion-plating method was experimentally confirmed. In that way, however, the temperature of the silicon wafer goes up over the Au-Si eutectic temperature, leading to a highly elevated resistivity of the alloyed silicon, to the detriment of the Ohmic contact of the strain transducer.

The present inventors have discovered that if, during the forming of the gold film by the vacuum deposition method, there is used as the evaporating source gold mixed with 0.1 ~ 10 weight % of gallium or aluminium, the adhesion between the gold and silicon was improved to such a degree that stripping of the gold film from the silicon wafer did not take place. The reason why gold containing gallium or aluminium is strongly adherent on silicon is as follows. It is generally known that the larger the heat of formation of the oxide of a metal, the more liable it is to form an oxide layer at an interface, and as a result the greater is the adhesion of the metal to an evaporation substrate. The vapor pressures of gallium and aluminium are higher than that of gold. Thus, as the mixture of gold and gallium or aluminium from the evaporation souce, is vacuum-deposited, a gold film rich in gallium or aluminium is formed at the interface with the silicon, so that an oxide layer of gallium or aluminium is formed by absorbing oxygen gas during its evaporation, thereby improving the adhesion between the silicon wafer and the gold film. The adhesive strength of the gold film formed from gold with a gallium or aluminium content of 0.1 ~ 10% as an evaporation source was more than 10 times that of a pure gold film (99.99%), as measured by a scratch test. For such a composition, the stripping of the gold film from silicon did not take place during the etching. However, when the amount of gallium or aluminium was more than 50%, the gold film was stripped from the silicon wafer during the step of dissolving it with aqua regia. Thus, an upper limit exists for the amount of gallium or aluminium, because they dissolve in aqua regia. On the other hand, too little gallium or aluminium reduces the ability of achieving a proper adhesion. Furthermore, because of the higher hydrogen overvoltage of gallium and aluminium as compared to gold, reductions in the etching rate may occur as compared with that for pure gold, where gallium or aluminium are present, but the reduction in the rate are negligibly small when the gallium or aluminium content is within 0.1 ~ 10%. Moreover, despite the fact that the melting point of gallium is 29.8°C, the gold film formed from gold containing 0.1 ~ 10% gallium as an evaporation source was not stripped from the silicon.

In the method of making the transducers as described above, it has been found that irregular etching of the inside surface of wafer is sometimes caused by the generation of gases formed by the reaction between the silicon and the etchant. That is gases may be generated as reaction products as the silicon reacts with the etchant, and the gases tend to adhere to the wafer in the form of bubbles, so that fresh etchant does not reach the part of the surface covered by these bubbles. With the passage of time during the etching reaction, the diameter of the bubbles will grow larger, and they will begin to free themselves from the surfaces of the silicon wafer. The conditions under which the bubbles are liberated from the silicon wafer are influenced by complex factors, and because of the disparity of these factors inside the surfaces of the wafer, the times at which the bubbles leave the parts of the surfaces of the silicon wafer are irregular. At the part where the bubbles are freed at an early time in the etching cycle, the progress of etching is rapid, because fresh etchant reaches this part of the surface. Conversely, at the part where the bubbles come off later, the etching proceeds slowly, because the action of the fresh etchant is delayed. As a result, the etching rate is different at different parts of the wafer surfaces, thereby causing a major disparity in the etching process. Consequently, if the bubbles, being the products of the etching reaction, are removed as soon as they are fully generated, the irregularity of the etching reaction at the parts of the wafer surfaces will be very much reduced.

Figure 12:
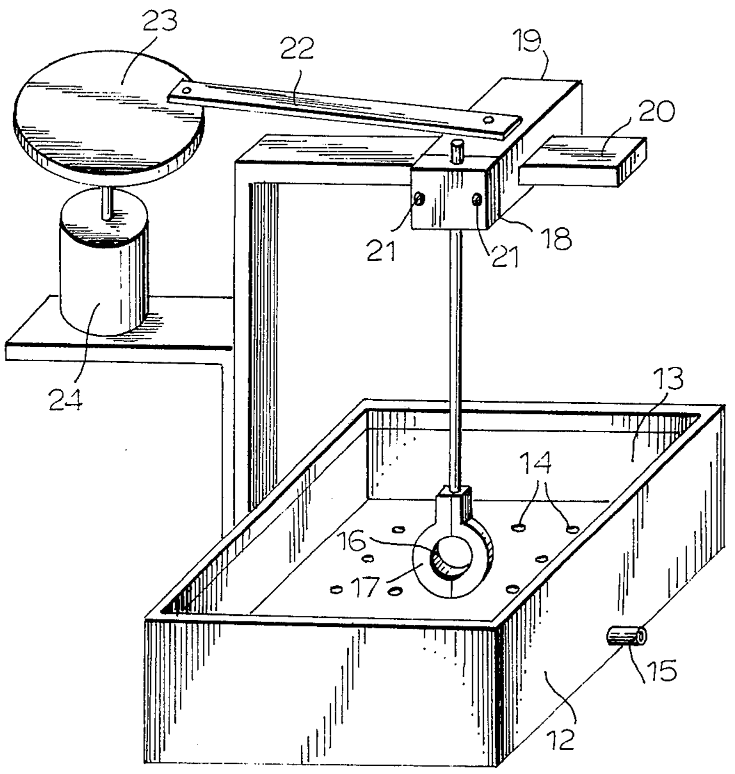
FIG. 12 is a perspective view of an etching machine employed in this invention.

FIG. 12 is a perspective view of an etching machine employed in this invention for decreasing the irregularity of the etching. A vessel 12 in which the etchant is contained has an inner bottom in which a plurality of holes 14 are provided. The inner bottom is spaced from the outer bottom. Gas such as nitrogen or the like, under pressure, is supplied to the space between the inner and outer bottoms through an inlet pipe 15. The gas is jetted through the plurality of holes 14, and thereafter the gas will be bubbled up through the etchant. The silicon wafer 16 is immersed in the etchant 13, while being held by the wafer holder 17. The top end of the wafer holder 17 is securely held by a clamping means 18. A movable block 19 which is movable along a guide 20, and on one end of the guide, the clamping means 18 is attached by means of screws 21, with the top end of the wafer holder 17 being held between the clamping means 18 and the movable block 19. As an alternative construction of the clamping means 18, there can be provided means for holding the top end of the wafer holder on the movable block by the force of a spring without using screws 21. A link 22 forming part of a reciprocating means, is pivoted at one end thereof to the movable block 19, and at the other end to the perimeter of a rotary disc 23 which in turn is rotated by the motor 24. It is also possible to provide a reciprocating means which utilizes a rotary cam. In the etching machine of FIG. 12, the bubbles of nitrogen, etc., coming continuously through the plurality of holes 14, as they float up along the surfaces of the silicon wafer submerged in the etchant, entraining the bubbles of the reaction products from the surfaces of the wafer, and accordingly, a gas such as nitrogen, etc., acts to liberate the bubbles of the reaction products. The wafer is reciprocated in the etchant by the reciprocating means so that the bubbles coming continuously through the plurality of holes 14 will act uniformly on the overall surface of the wafer, thereby removing all the bubbles, which are the reaction products generated at the wafer surfaces, from the wafer surfaces a short period of time after they are generated.

Figure 13:
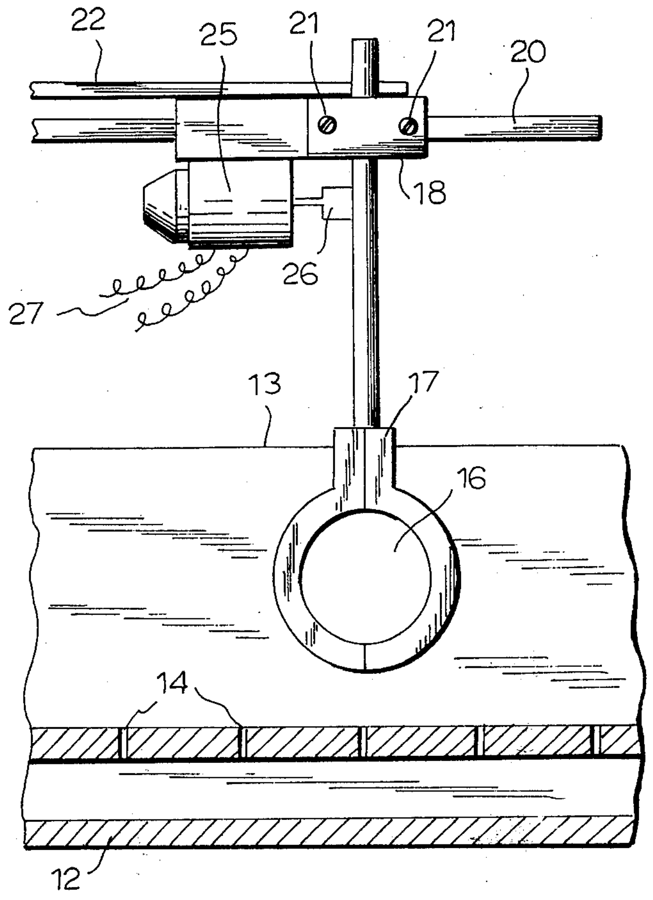
FIG. 13 is a partial elevation view of the essential part of a modified form of the etching machine employed in this invention.

FIG. 13, which is a side elevation view of the essential parts of the etching machine of FIG. 12, further shows a shock impressing means attached thereto. The shock impressing means consists of a push type solenoid having a fixed iron core and a solenoid plunger 26. As a voltage is supplied through the wires 27, the plunger 26 is moved so as to come in contact with the top end of the clamping means 17 to give it a mechanical shock. An adequate solenoid is one with a maximum power of attraction of 500 g. Other shock producing means, such as vibrators, rotary cams, etc., can be used.

In this apparatus, as the shock impressing means gives a mechanical shock to the top end of the wafer holder 17, the wafer 16 being held by 17 receives the mechanical shock. Upon receiving the mechanical shock from whatever direction, either parallel or perpendicular to the wafer surfaces, the bubbles adhering to the wafer surfaces are almost completely released from the surfaces of the wafer. Thus, the etching machine equipped with such a shock impressing means is better than a machine without one. It enables the etching to be carried with greater regularity.

Figure 14:
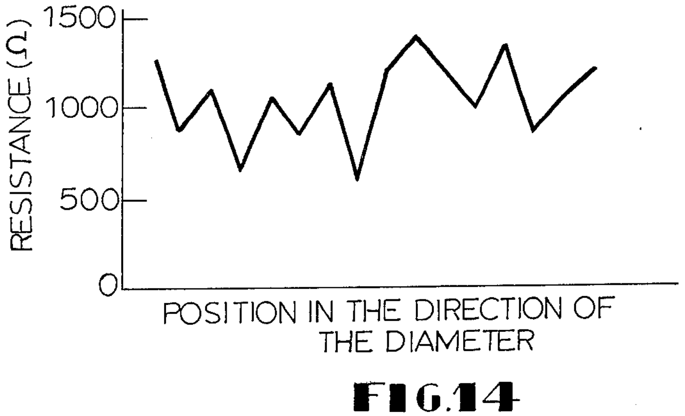
FIG. 14 is a graph of the distribution of the resistances of strain transducers in the direction of the diameter of a circular wafer obtained when the wafer was merely immersed in the etching solution.
Figure 15:
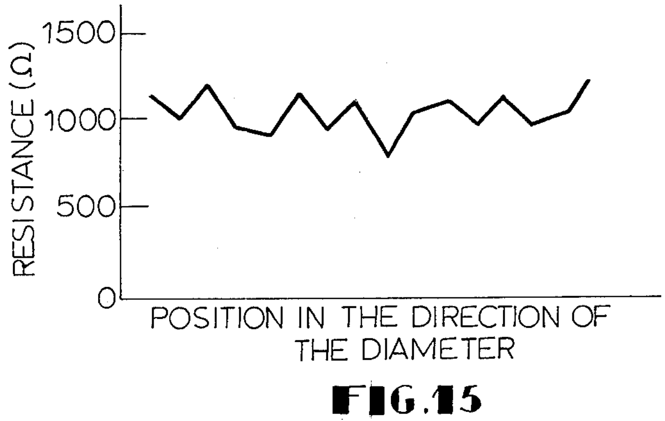
FIG. 15 is a graph of the distribution of the resistances of the strain transducers in the direction of the diameter of the wafer obtained when the etching machine of FIG. 12 was used.
Figure 16:
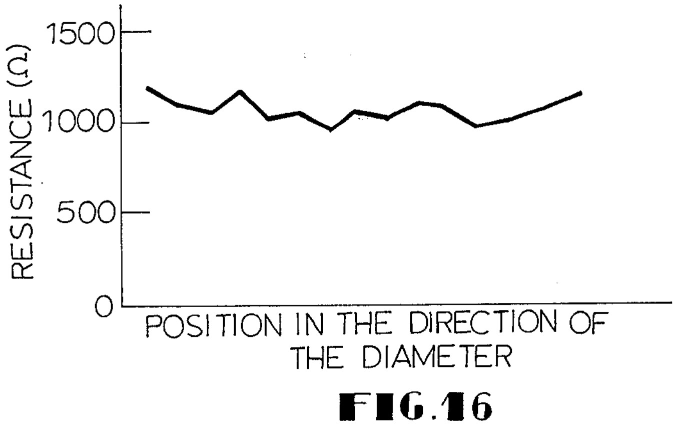
FIG. 16 is a graph of the distribution of the resistances of the strain transducers in the direction of the diameter of the wafer obtained when the etching machine of FIG. 13 was utilized.

FIG. 14 is a graph showing the distribution of the resistances of necks of transducers at positions in the direction of the diameter of a circular wafer which transducers are formed by merely immersing the wafer in the etchant. FIG. 15 shows the distribution of the resistances when the wafer was reciprocated at a speed of 6 cycles/min. over a distance of 15 cm on the etching machine of FIG. 12, with the rate of the flow of nitrogen through the plurality of holes of 8 l/min., showing a clear improvement in the amount of scatter over FIG. 14. FIG. 16 is a graph obtained when the etching is carried out with the etching machine of FIG. 13, with the plunger set to work at a rate of 12 cycles/min., showing further improved uniformity of resistances as compared with the result shown in FIG. 15.

It is to be understood that the application of the method of this invention is not limited to the embodiments described hereabove, but minor modifications may be made without departing from the spirit of this invention.

What is claim is:

1. A method of making strain transducers, which comprises the steps of:

depositing gold films on the opposite face surfaces of a semiconductor wafer;

coating the gold films deposited on the surfaces of the wafer with a photoresist coating;

removing the photoresist on the gold films selectively in a pattern of semiconductor strain transducers by a photolithographic process;

dissolving the gold films exposed through the photoresist by immersing the wafer in aqua regia, so that patterns of a plurality of semiconductor strain transducers is exposed on both surfaces of the wafer;

etching the exposed parts of the wafer to partially remove the material of the wafer at the exposed portions;

removing part of the photoresist so that at least two gold films are exposed which have a plurality of strain transducers extending therebetween;

using the gold films as electrodes, measuring the resistance between the two common gold films, whereby the parallel resistance of the strain transducers is measured; and stopping the etching of the wafer when the resistance reaches the desired value.

2. A method of making strain transducers as claimed in claim 1, wherein the gold films consist essentially of, as a major element, gold and, as an additive element, an element selected from the group consisting of gallium and aluminium.

3. A method of making strain transducers as claimed in claim 1, wherein the etching step comprises;

flowing a gas into the etchant, so that bubbles of the gas are produced in the etchant which flow toward the upper surface of the etchant; and reciprocating the wafer in the etchant through the bubbles flowing in the etchant.

4. A method of making strain transducers as claimed in claim 3, wherein the etching step further comprises;

impressing periodic shocks on the wafer.

* * * * *